June 20, 1950  J. E. ANDERSON  2,512,005
DUAL-ROTATION TRANSFER-BEARING THRUST PLATE
Filed March 20, 1947  3 Sheets-Sheet 3
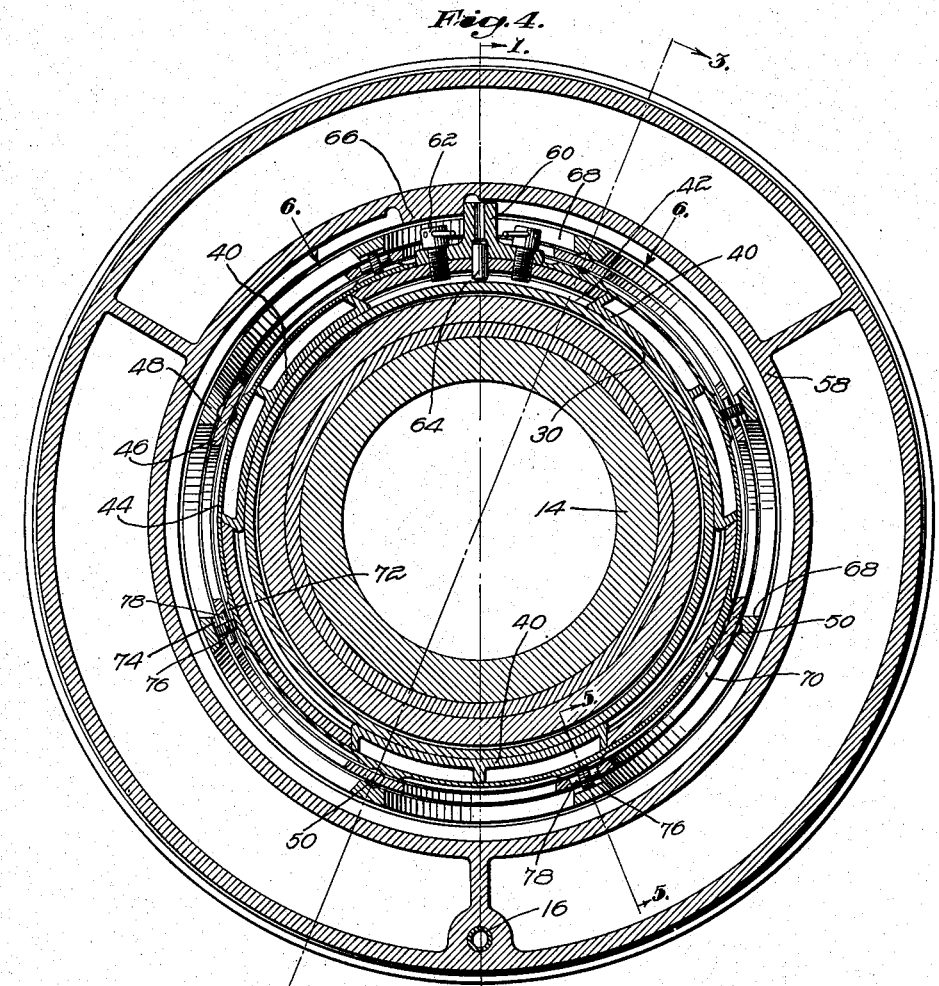
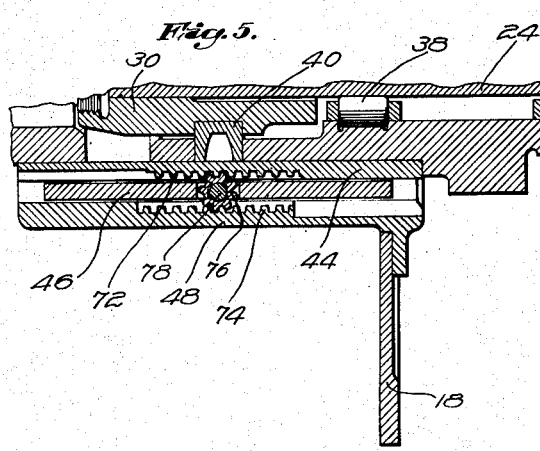
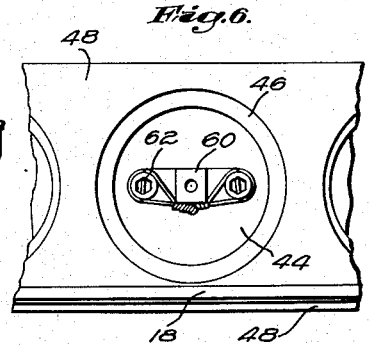
INVENTOR
John E. Anderson
BY Harris G. Luther
ATTORNEY

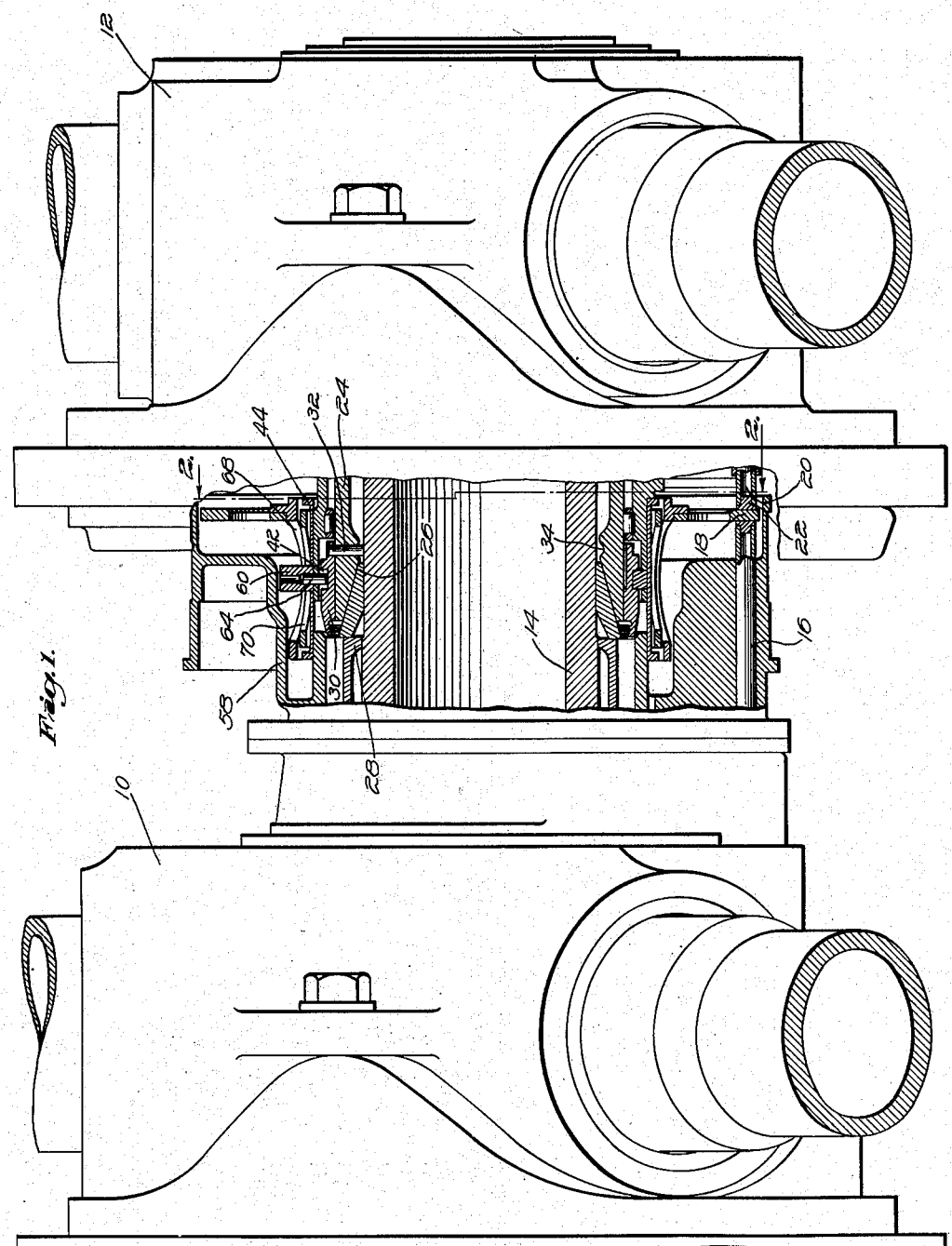

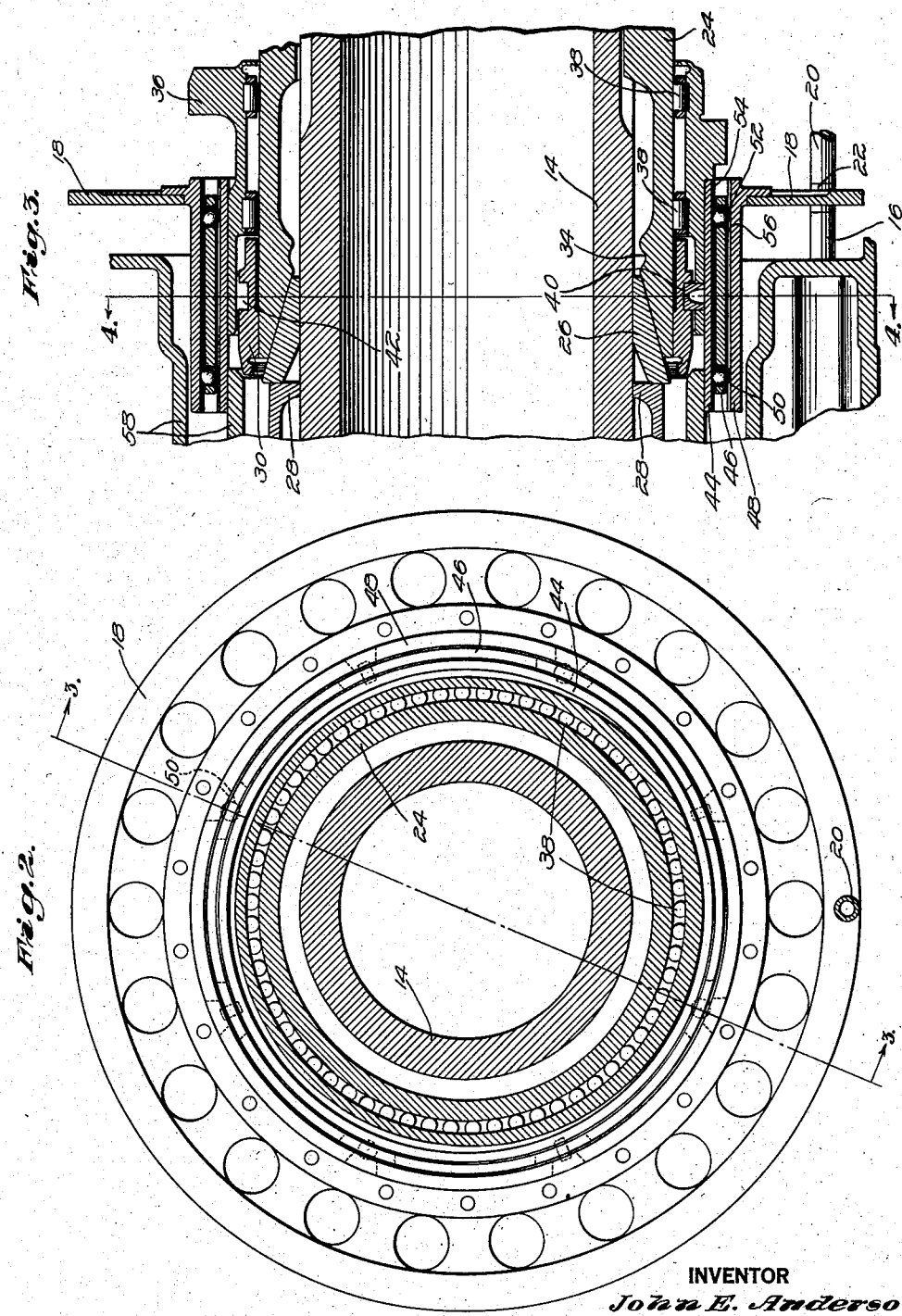

Patented June 20, 1950

2,512,005

UNITED STATES PATENT OFFICE 2,512,005

DUAL-ROTATION TRANSFER-BEARING THRUST PLATE

John E. Anderson, Portland, Conn., assignor to United Aircraft Corporation, East Hartford, Conn., a corporation of Delaware Application March 20, 1947, Serial No. 735,823

9 Claims. (Cl. 170—135.28)

This invention relates to motion transferring mechanism and particularly to mechanism for transferring motion from one of two coaxial oppositely rotating aeronautical propellers to the other for actuating propeller pitch control means.

Attempts have been made to control the pitch of the outboard propeller of a pair of coaxial oppositely rotating propellers by utilizing a transfer bearing between the two propellers which in essence was an ordinary ball bearing. The inner race of the bearing is moved axially by mechanism which may be associated with the inboard propeller so as to move the outer race of the bearing through the interposed balls. Movement of the outer race moves mechanism associated with the outboard propeller to control the propeller pitch. Where the entire pitch changing force was transmitted through the bearings, it was found difficult to lubricate the bearing and where servomotors were used and only small forces transmitted from one propeller to another, this type of bearing is impractical because of the friction resisting axial movement. I have found that by mounting a thrust plate so as to rotate with one of the propellers and allowing the movable element in the other propeller to slide around the thrust plate and then mounting the thrust plate on a sleeve supported on anti-friction bearings to reduce the friction of axial movement, a satisfactory transfer mechanism may be made which will transfer the motion from one propeller to the other even when the force from each propeller is applied along a single longitudinal axis eccentric to the axis of rotation of the propeller.

An object of this invention is to provide a simple and efficient mechanism for transferring motion from one propeller to another of a pair of oppositely rotating coaxial propellers.

Another object of this invention is a mechanism for actuating an eccentrically mounted control valve of one propeller of a pair of concentric oppositely rotating propellers by the motion of a similar eccentrically mounted control valve of the other propeller.

A further object of this invention is the provision of a thrust plate between two oppositely rotating concentric propellers which may be readily movable by an eccentrically applied force in each propeller without binding the bearing under the eccentric loads.

A further object of this invention is an improved bearing for supporting the thrust plate between two oppositely rotating propellers and including an improved ball retaining means.

These and other objects and advantages of the invention will be apparent from the specification and claims and from the accompanying drawings which illustrate what is now considered to be a preferred embodiment of the invention.

In these drawings:

Fig. 1 is a side elevation of two concentric oppositely rotating propellers with a portion broken away to show the thrust transfer mechanism in sections.

Fig. 2 is a section taken on the lines 2—2 of Fig. 1.

Fig. 3 is a section taken on the lines 3—3 of Figs. 2 or 4.

Fig. 4 is a section taken on the line 4—4 of Fig. 3.

Fig. 5 is a detailed enlarged section taken on the lines 5—5 of Fig. 4.

Fig. 6 is a top plan view of a portion of the transfer thrust ring assembly with surrounding mechanism removed and taken generally on the lines 6—6 of Fig. 4.

As herein shown, Fig. 1 illustrates the general assembly in which an inboard propeller 10 and a concentric outboard propeller 12 are mounted on oppositely rotating coaxial shafts driven by the usual engine (not shown). The propellers are mounted on telescoped shafts, inboard propeller 10 being mounted on the outer shaft (not shown) and outboard propeller 12 being mounted on inner shaft 14. These shafts may be driven in opposite directions in the usual manner by reversing gearing usually located in the engine nose.

Each propeller incorporates pitch changing mechanism by means of which the propeller pitch may be varied during operation of the propeller. In order to maintain a predetermined ratio between the pitch of the two propellers or to adjust the pitch of the outboard propeller, it has been found convenient to transfer motion from the inboard propeller 10 to the outboard propeller 12.

In the assembly shown, the inboard propeller 10 utilizes a valve having a follow-up connection with the blades for controlling the flow of oil to and from pitch changing mechanism for adjusting the propeller pitch. This valve has an extension 16 carried by and rotatable with the inboard propeller. A corresponding valve stem 20 carried by and rotatable with the outboard propeller 12 is secured to or actuates a corresponding valve in the outboard propeller, which valve has a similar follow-up connection with the blades of the outboard propeller for controlling their pitch.

The details of the pitch changing mechanism are not part of the present invention and are therefore not shown in detail. It is believed sufficient to show only the connections to the pitch changing mechanism which are moved to effect the pitch changing movements of the blades. The propellers which have been utilized for the purpose of explaining this invention are shown in more detail in Martin application Serial No. 609,843 for Propeller controls, filed August 9, 1945 to which reference may be made for a more detailed explanation of the propellers and the pitch changing mechanism therefor. In the modification disclosed, the valve stem 20 is spring pressed toward the thrust plate 18, and valve stem 16 is mechanically or hydraulically actuated to overcome the spring pressure and move the thrust plate and valve stem 20 toward the right to change the blade pitch in one direction or to offer a sufficiently small resistance to movement so that it may be moved to the left under the effects of the spring pressure applied to valve stem 20 to change the blade pitch in the other direction. A button 22 which may be of friction reducing material such as graphite, bronze or cast iron, in the end of valve stem 20 slides around the periphery of the thrust plate 18 and is lubricated in any suitable manner such as oil supplied through passages in the button from the oil pressure supply of the pitch changing mechanism of the outboard propeller.

An extension 24 of the outboard propeller hub surrounding shaft 14, extends in an inboard direction and bears on the usual inboard centering cone 26 which in turn butts against a sleeve 28 positioned in a well-known manner against a shoulder (not shown) on the shaft 14. A sleeve 30 surrounds the inboard end of the hub extension 24 and is pinned in position on the hub extension by a pin 32. If desired, this pin may be the radially extending portion of a snap ring engaged in depression 34. A cam member 36, utilized, in the disclosed modification, for actuating pumps to supply fluid under pressure to the pitch changing mechanism (not shown in the present application) is mounted to rotate relative to extension 24 on roller bearings 38 and is held against axial movement by means of shoes 40, preferably of bronze, which are fitted into apertures in the cam member 36 and extend into a groove 42 in sleeve 30.

As shown in Fig. 4, three bronze shoes are provided and it will be noted that they are shaped so that they can be slid through apertures in cam 36 and into the groove 42 in sleeve 30. During operation these shoes are carried by the cam 36 and slide around in groove 42 thus permitting relative rotation but preventing relative axial movement between the members associated with shaft 14 and the cam 36.

A bearing comprising an inner sleeve 44, a ball retaining sleeve 46 and an outer sleeve 48 surrounds the inboard end of the cam 36. The inner sleeve 44 holds shoes 40 against radial displacement. Ball retainer 46 is provided with holes only slightly larger than, and shaped to retain therein, ball bearing elements 50 and 52 received therein and thus holds ball bearing 50, 52 in position between the inner and outer races formed by sleeves 44 and 48. These balls roll in corresponding axially extending grooves 54 and 56 in the inner and outer sleeves 44 and 48 respectively. An extension 58 of the hub of the inboard propeller 10, which also forms a portion of an oil guard between the two propellers, acts to support the inboard end of the inner sleeve 44.

A driving lug 60 is secured to the inboard end of the cam 36 by means of screws 62 and a dowel 64. Rotation of the outboard propeller and its pumping mechanism with respect to cam 36 tends to drag the cam 36 along with it and does so until driving lug 60 comes in contact with a projection 66, extending inwardly from the hub extension 58 into the path of the driving lug 60. Thereafter cam 36 is driven by and rotated with the inboard propeller while the outboard propeller tends to rotate the cam in the opposite direction.

Driving lug 60 extends through a closely fitting aperture in the inner sleeve 44 and thus acts to position sleeve 44 on cam 36 and drive that sleeve with the inboard propeller. The driving lug 60 extends through one of a series of equally spaced weight reducing apertures 68 and 70 in the outer sleeve 48 and ball retaining sleeve 46 respectively. This aperture provides sufficient clearance for axial movement of sleeves 46 and 48 without interference with lug 60.

It will be noted from Fig. 4 that a plurality of bearing elements are provided around the periphery of the bearing sleeves 44, four such groups being shown in Fig. 4. Between each group of bearing elements the inner race or sleeve 44 and the outer sleeve 48 are provided with corresponding rack gear teeth indicated at 72 and 74 respectively. A gear 76 meshes with these sets of corresponding rack gear teeth and is rotatably mounted on a pin 78 retained in the ball retainer 46. This gearing insures that the bearings and the retainer will always be centrally axially positioned between the inner sleeve 44 and outer sleeve 48 and causes the ball retainer to move in the same direction, but only half the distance, that one sleeve moves with respect to the other.

From the structure described, it will be apparent that means have been provided for mounting an inter-propeller thrust plate for rotation with the inboard component of a pair of oppositely rotating coaxial propellers. The thrust plate has also been mounted on anti-friction bearings for movement along the axis of rotation of the propeller so that movement of valve stem extension 16 will impart axial movement to thrust plate 18 and thus impart axial movement to the valve stem 20 sliding on the periphery of the thrust plate. It will be noted that although only one valve stem is shown in each propeller, which will result in an eccentric loading on the thrust plate especially when the valves are at diametrically opposite positions, the spaced bearing construction will absorb the eccentric loading without excessive lost motion or friction.

Thrust plate 18 is mounted on and carried by outer sleeve 48 and is secured thereto in any desired manner, such as by riveting.

It is to be understood that the invention is not limited to the specific embodiment herein illustrated and described, but may be used in other ways without departure from its spirit as defined by the following claims.

I claim:

1. A support for an inter-propeller thrust transfer plate located between two oppositely rotating coaxial propellers comprising a pair of telescoping sleeves arranged coaxially with said propellers, means for supporting said sleeves on one of said propellers, a plurality of circumferentially spaced groups of axially spaced bearing elements connecting said sleeves and located in axially extending grooves in adjacent surfaces of said sleeves, a thrust plate carried by one of said sleeves, thrust exerting means carried by each propeller and bearing on said plate, and means for securing said other sleeve to one of said propellers against axial movement with respect to said one propeller.

2. A support as claimed in claim 1 in which means are provided for positively driving said other sleeve from one of said propellers.

3. A device as claimed in claim 2 including a bearing retainer coaxially with and intermediate said sleeves, means for retaining said bearing elements in said retainer, an axially extending gear rack on adjacent surfaces of each sleeve, a pinion gear meshing with said racks and journalled in said retainer.

4. A support for an inter-propeller thrust transfer plate located between two oppositely rotating coaxial propeller hubs, comprising a pair of telescoping sleeves arranged coaxially with said propeller hubs, bearing means between one of said sleeves and one of said propeller hubs for rotatably supporting said sleeve with respect to said propeller hub, a plurality of circumferentially spaced groups of axially spaced bearing elements arranged between said sleeves in axially extending grooves in said sleeves, a thrust plate carried by the other of said sleeves, thrust exerting means carried by each propeller hub and bearing on said plate, and means for securing said one sleeve to one of said propellers against axial movement with respect to said one propeller.

5. A support for an inter-propeller thrust transfer plate located between two oppositely rotating coaxial propellers comprising three telescoping sleeves arranged coaxially with said propellers and comprising two bearing sleeves and an intermediate retainer sleeve, a plurality of circumferentially spaced groups of axially spaced bearing elements extending radially through said retainer but held against substantial axial movement with respect to said retainer said elements connecting said bearing sleeves and arranged in axially extending grooves in said sleeves, an axially extending gear rack carried by each bearing sleeve, a pinion journalled in said retainer and meshing with both of said racks, a thrust plate carried by one of said bearing sleeves and means connecting said other bearing sleeve and one of said propellers for holding said other bearing sleeve against axial movement with respect to said one propeller.

6. A device as claimed in claim 5 in which bearing means are provided for rotatably mounting said thrust plate with respect to one of said propellers.

7. Mechanism for transferring motion from one of two coaxial oppositely rotating propellers to the other comprising a carriage, a thrust plate supported on the carriage, and comprising a disc arranged coaxially with said propellers, ball bearing grooves in said carriage extending parallel with the axis of rotation of said propellers, a coaxial bearing sleeve carried by one of said propellers, corresponding grooves in said coaxial bearing sleeve carried by one of said propellers, ball bearings arranged in said grooves, means connecting said sleeve and said one propeller for holding said sleeve against axial movement with respect to said one propeller, thrust exerting elements carried by each propeller and bearing on said thrust plate, axial movement of one of said elements imparting corresponding axial movement to the other member through said thrust plate.

8. In combination with one propeller mounted to rotate in one direction and having a control valve element located at one side of the axis of rotation of said propeller, another propeller mounted to rotate in the opposite direction on a concentric axis and having another control valve element located at one side of the axis of rotations of said other propeller, means for transferring motion from one valve element to the other valve element while the propellers are rotating comprising a sleeve rotatably mounted on and concentric with said one propeller, means for holding said sleeve against axial movement with respect to said one propeller, a second sleeve surrounding said first-mentioned sleeve, a plurality of rows of anti-friction bearing elements arranged in grooves in said sleeves extending longitudinally of said axis and supporting said second sleeve on said first mentioned sleeve, a thrust plate comprising a disc carried by said second sleeve, the control valve element of said one propeller bearing on one side of said thrust plate and the control valve element of said other propeller bearing on the other side of said thrust plate.

9. In combination with one propeller mounted to rotate in one direction and having a control valve element located at one side of the axis of rotation of said propeller, another propeller mounted to rotate in the opposite direction on a concentric axis and having another control valve element located at one side of the axis of rotation of said other propeller, means for transferring motion from one valve element to the other valve element while the propellers are rotating comprising a sleeve supported concentric with said propellers, means for driving said sleeve from and with one of said propellers, and means for holding said sleeve against axial movement, a second sleeve surrounding said first-mentioned sleeve, a plurality of rows of anti-friction bearing elements arranged in grooves in said sleeves extending longitudinally of said axis and supporting said second sleeve on said first mentioned sleeve, a third sleeve located intermediate said two aforementioned sleeves, means for retaining said bearing elements in said third sleeve, and means for axially centralizing said third sleeve and its retained bearing elements with respect to said two sleeves, a thrust plate comprising a disc arranged coaxial with said propellers, carried by said second sleeve, the control valve element of said one propeller bearing on one side of said thrust plate and the control valve element of said other propeller bearing on the other side of said thrust plate.

JOHN E. ANDERSON.

REFERENCES CITED

The following references are of record in the file of this patent:

UNITED STATES PATENTS

| Number | Name | Date |
|---|---|---|
| 2,123,057 | Martin | July 5, 1938 |
| 2,341,730 | McNab | Feb. 15, 1944 |
| 2,362,444 | Blanchard et al. | Nov. 14, 1944 |

FOREIGN PATENTS

| Number | Country | Date |
|---|---|---|
| 546,291 | Great Britain | July 6, 1942 |